US012376196B1

(12) United States Patent
Ye et al.

(10) Patent No.: US 12,376,196 B1
(45) Date of Patent: Jul. 29, 2025

(54) MANUFACTURING PROCESS FOR A FOOD WARMING PAD

(71) Applicant: Guangdong Willing Technology Corporation, Guangdong (CN)

(72) Inventors: Jingnong Ye, Guangdong (CN); Shifa Luo, Guangdong (CN); Kunhuan Feng, Guangdong (CN)

(73) Assignee: Guangdong Willing Technology Corporation, Huizhou (CN)

( * ) Notice: Subject to any disclaimer, the term of this patent is extended or adjusted under 35 U.S.C. 154(b) by 0 days.

(21) Appl. No.: 19/010,195

(22) Filed: Jan. 6, 2025

(51) Int. Cl.
*H05B 3/18* (2006.01)
*H05B 3/34* (2006.01)
*H05B 3/36* (2006.01)
*H05B 3/64* (2006.01)

(52) U.S. Cl.
CPC ................. *H05B 3/34* (2013.01); *H05B 3/18* (2013.01); *H05B 3/36* (2013.01); *H05B 3/64* (2013.01); *H05B 2203/014* (2013.01); *H05B 2203/017* (2013.01)

(58) Field of Classification Search
CPC ............... H03B 3/18; H03B 3/36; H03B 3/64
See application file for complete search history.

(56) References Cited

U.S. PATENT DOCUMENTS 12,109,739 B1 10/2024 Chen
2004/0195234 A1 10/2004 Kaesler
2009/0032519 A1* 2/2009 Schlipf .................... H05B 3/46 219/544
2012/0163894 A1* 6/2012 Xiao .................... H01H 13/705 400/490
2018/0093455 A1* 4/2018 Zou ......................... B32B 27/08
2022/0117045 A1 4/2022 Lindskog
2024/0365442 A1* 10/2024 Ye ........................... A47J 39/02

FOREIGN PATENT DOCUMENTS

CN 102811908 A * 12/2012 ............... H05B 3/36
CN 105583987 A * 5/2016
CN 109111740 A * 1/2019
CN 219742383 U * 9/2023 .............. A47J 39/02
CN 222283513 U * 12/2024
KR 100397165 B1 * 9/2003
KR 101213031 B1 * 12/2012 ......... H01L 23/3731
KR 20210070952 A * 6/2021 ............. F24D 13/02

OTHER PUBLICATIONS

English machine translation for KR101213031 (Year: 2012).*
English machine translation of CN105583987 (Year: 2016).*
English machine translation for CN109111740 (Year: 2019).*
English machine translation for KR20210070952 (Year: 2021).*
English machine translation for CN222283513 (Year: 2024).*
English translation of CN102811908 (Year: 2012).*
English translation of KR100397165 (Year: 2003).*

* cited by examiner

*Primary Examiner* — Scott W Dodds
(74) *Attorney, Agent, or Firm* — S.J. Intellectual Property LTD.

(57) ABSTRACT

A manufacturing process for a food warming pad includes the following steps: a pad body with a groove formed on a second surface is manufactured by an integrated molding process; after the heating wire is embedded in the groove, an encapsulation glue is coated, and a drying operation is performed; after the encapsulation glue is completely cured, a controller is installed; and then, a test is performed to obtain a qualified food warming pad.

17 Claims, 8 Drawing Sheets

A - A

MANUFACTURING PROCESS FOR A FOOD WARMING PAD

TECHNICAL FIELD

The present disclosure relates to a manufacturing process for a food warming pad.

BACKGROUND

A food warming pad is a household appliance used for heating food. It is typically made of thermally conductive materials and contains heating elements inside, which provide continuous heat to the food placed on the pad for purposes such as keeping warm, defrosting, and reheating.

SUMMARY

The present disclosure provides a manufacturing process for a food warming pad, including: step S1, forming a pad body including a first surface and a second surface having a groove by an integrated molding process; step S2, embedding a heating wire into the groove of the second surface of the pad body and exposing two ends of the heating wire out of a starting end and a terminal end of the groove respectively to form a heating body; step S3, applying an encapsulation glue into the groove with the heating wire embedded within to form a packaging body; step S4, drying the packaging body to solidify a surface of the encapsulation glue to form a first heating pad; step S5, standing the first heating pad at room temperature and pressure until the encapsulation glue is completely solidified to form a second heating pad; step S6, electrically connecting the two ends of the heating wire to a controller and fixing the controller to the second heating pad to form the food warming pad; and step S7, testing the food warming pad.

The present disclosure provides a manufacturing process for a food warming pad, including: step S1, forming a pad body including a first surface and a second surface having a groove by an integrated molding process; step S2, embedding a heating wire into the groove of the second surface of the pad body and exposing two ends of the heating wire out of a starting end and a terminal end of the groove respectively to form a heating body; step S3, applying an encapsulation glue into the groove with the heating wire embedded within to form a packaging body; step S4, drying the packaging body at a temperature of 70 to 80° C. for 15 to 20 minutes to solidify a surface of the encapsulation glue to form a first heating pad; step S5, standing the first heating pad at room temperature and pressure until the encapsulation glue is completely solidified to form a second heating pad; and step S6, electrically connecting the two ends of the heating wire to a controller and fixing the controller to the second heating pad to form the food warming pad.

BRIEF DESCRIPTION OF THE DRAWINGS

The drawings constituting a part of the present disclosure are configured to provide a further understanding of the present disclosure. The embodiments of the present disclosure and their descriptions are used for explaining and do not constitute an improper limitation on the present disclosure.

DETAILED WAY

Figure 1:
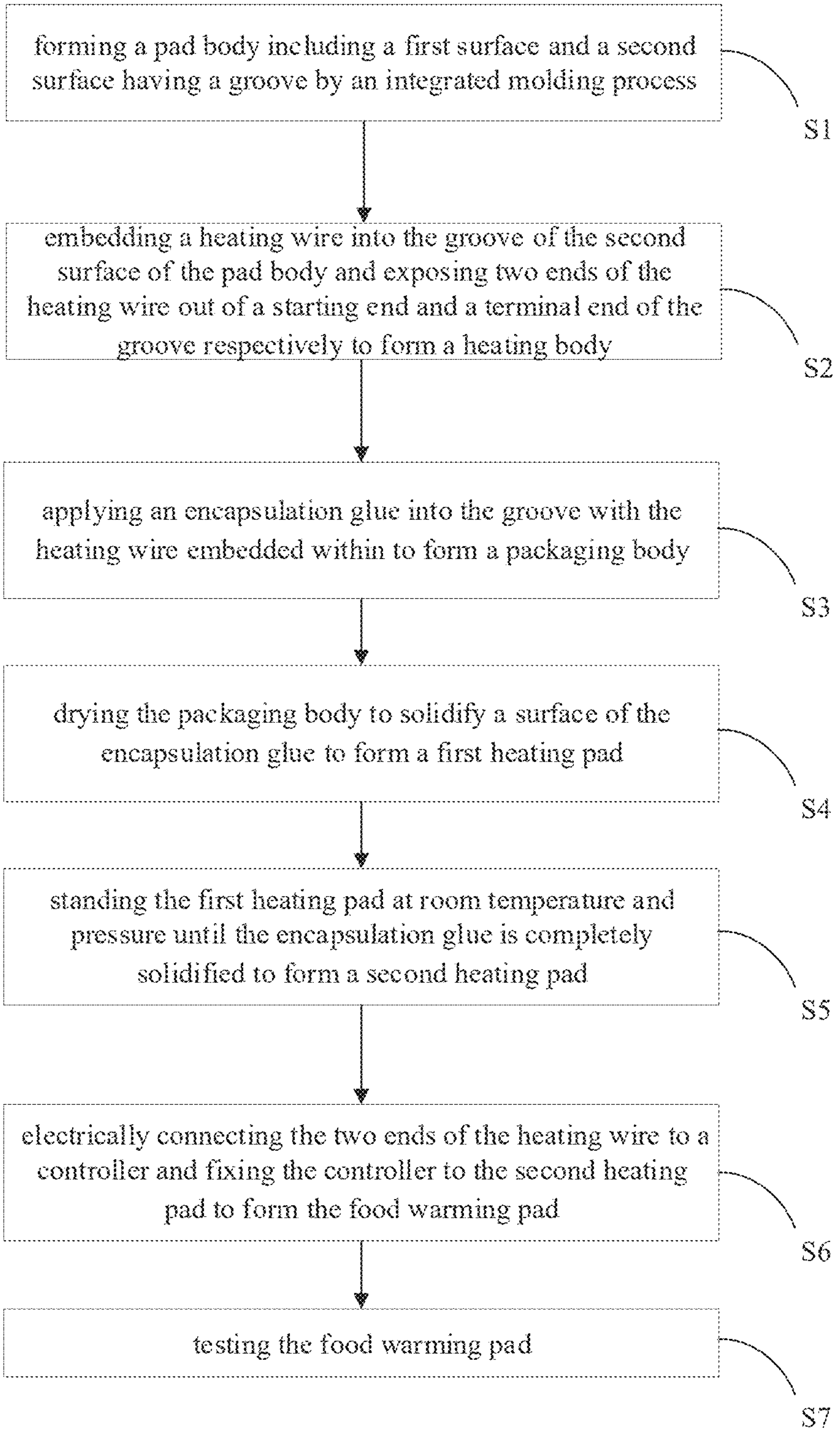
FIG. 1 is a flowchart of a manufacturing process of a food warming pad in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of some embodiments may be used according to another embodiment to produce yet another embodiment. Therefore, it is intended that the present disclosure includes such modifications and variations within the scope of the appended claims and their equivalents.

In the description of the present disclosure, the terms “longitudinal”, “lateral”, “upper”, “lower”, “front”, “back”, “left”, “right”, “vertical”, “horizontal”, “top”, “bottom” and the like indicate the orientational or positional relationship based on the orientational or positional relationship illustrated in the drawings, which is only for the convenience of describing and eliminates the require the present disclosure to be constructed and operated in a specific orientation, and therefore cannot be understood as limiting the present disclosure. The terms “connected”, “connecting” and “arranged” used in the present disclosure should be understood in a broad sense. For example, it may be a fixed connection or a detachable connection; it may be directly connected or indirectly connected through an intermediate component; it may also be a wired electrical junction, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms “first”, “second” and “third” are used interchangeably to distinguish one component from another and are not intended to indicate the position or importance of individual components.

According to some embodiments of the present disclosure, a pet pulling force test device is provided, which is configured to test the pulling force of a pet. A suitable traction rope 200 can be selected according to the magnitude of the pulling force. Moreover, it may record the pet's pulling force during its growth process, with changes in the pulling force serving as a health indicator. In addition, the current pulling force can be used to match the pet with suitable individuals. For example, a pet having a greater pulling force is suitable for young and middle-aged people, but not for children and the elderly.

In the related art, food warming pads often have a heating film placed between two sheets of thermally conductive material, which are bonded together using an adhesive. The manufacturing process involves cutting, aligning, bonding, and pressing the conductive materials, making it complex. Additionally, with prolonged use, the edges of the pad may be separated or curled.

Figure 2:
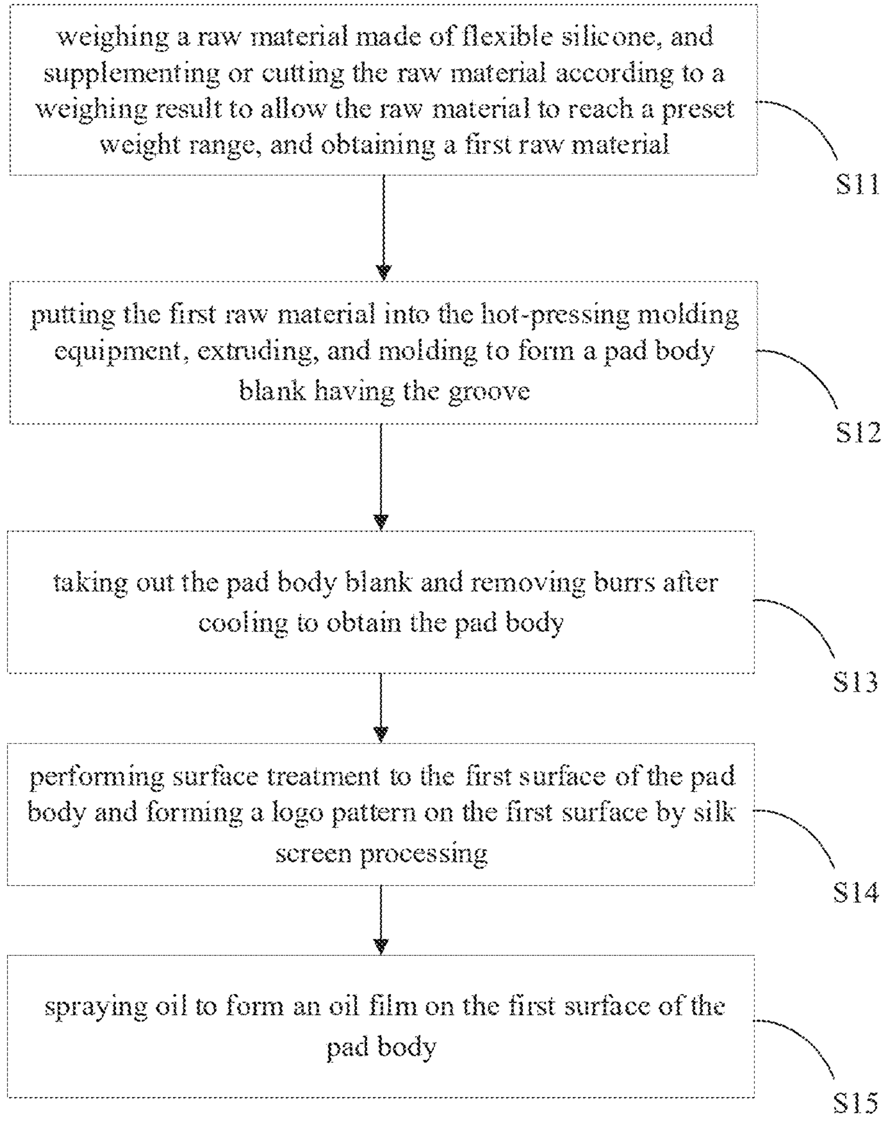
FIG. 2 is a flowchart of step S1 of the manufacturing process shown in FIG. 1 in accordance with the embodiment of the present disclosure.
Figure 3:
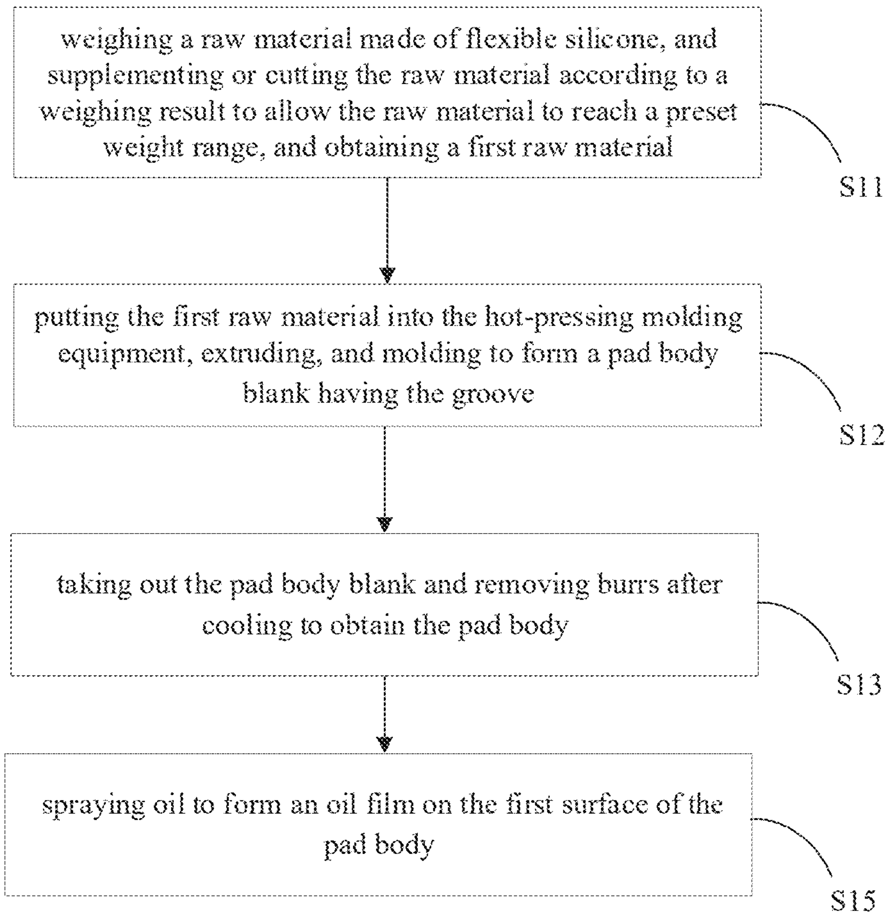
FIG. 3 is a flowchart of step S1 of the manufacturing process shown in FIG. 1 in accordance with the embodiment of the present disclosure.
Figure 4:
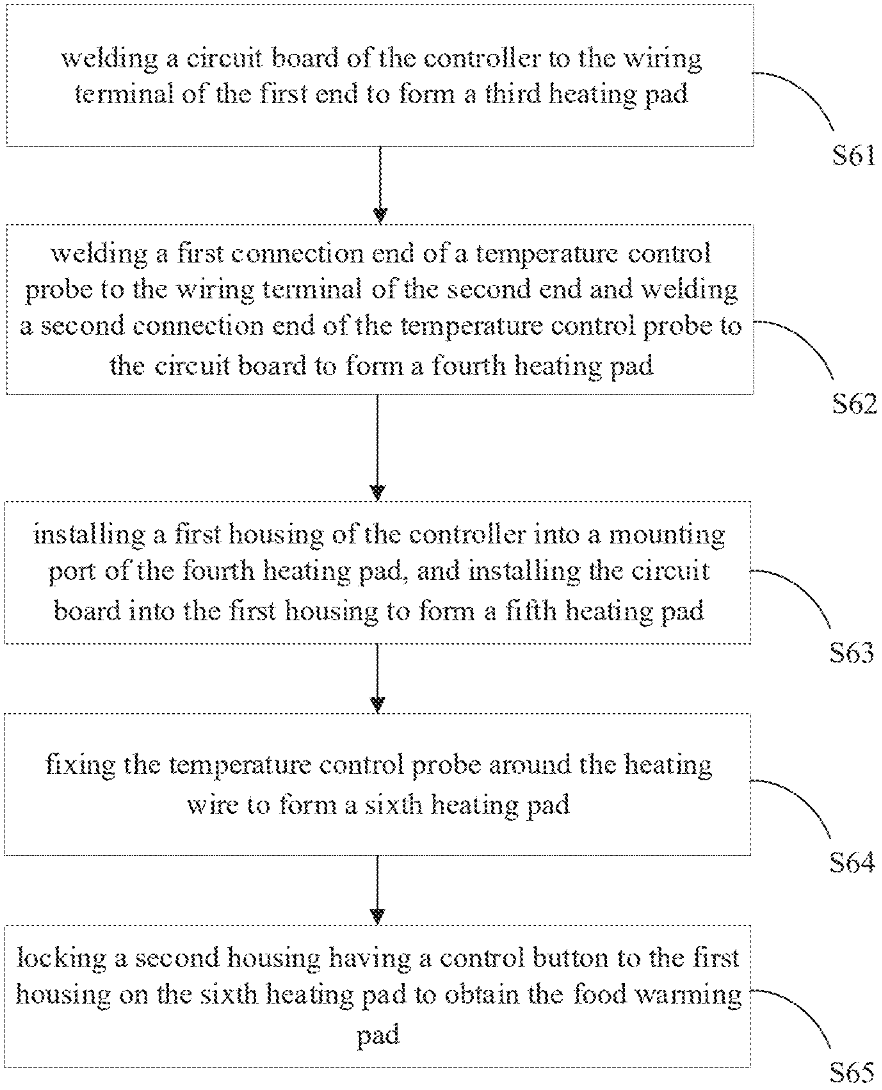
FIG. 4 is a flowchart of step S6 of the manufacturing process shown in FIG. 1 in accordance with the embodiment of the present disclosure.
Figure 5:
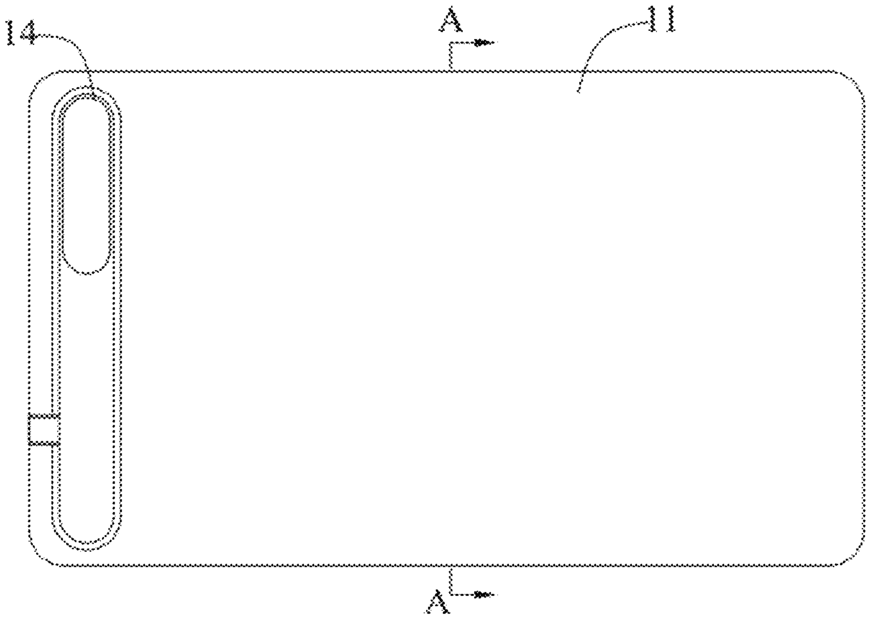
FIG. 5 is a perspective view of a food warming pad in accordance with the embodiment of the present disclosure.
Figure 6:
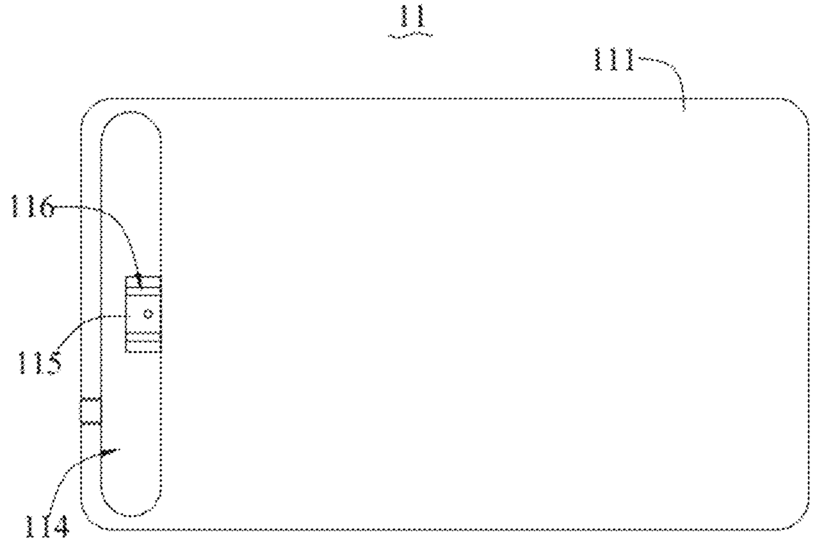
FIG. 6 is a top view of a pad body in accordance with the embodiment of the present disclosure.
Figure 7:
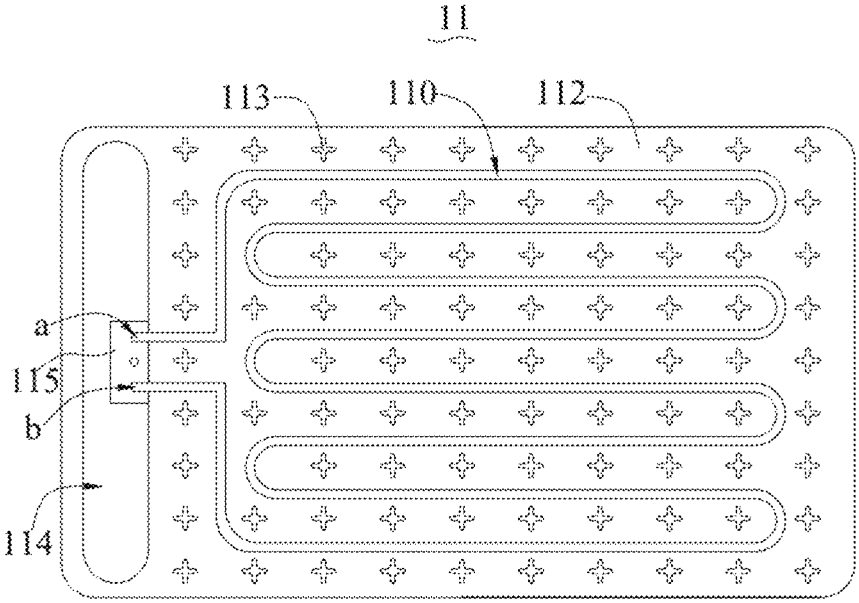
FIG. 7 is a bottom view of a pad body in accordance with the embodiment of the present disclosure.
Figure 8:
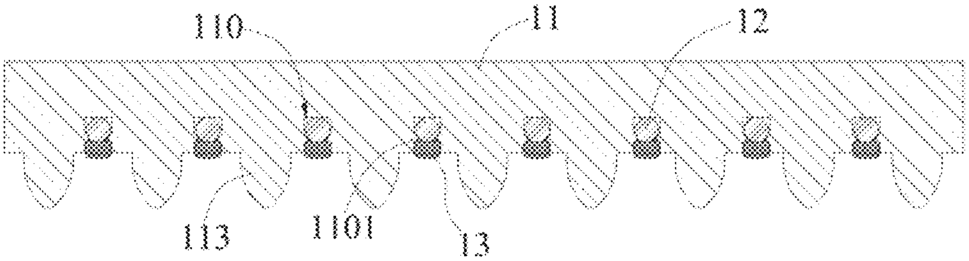
FIG. 8 is a sectional view taken along the line A-A in FIG. 5.
Figure 9:
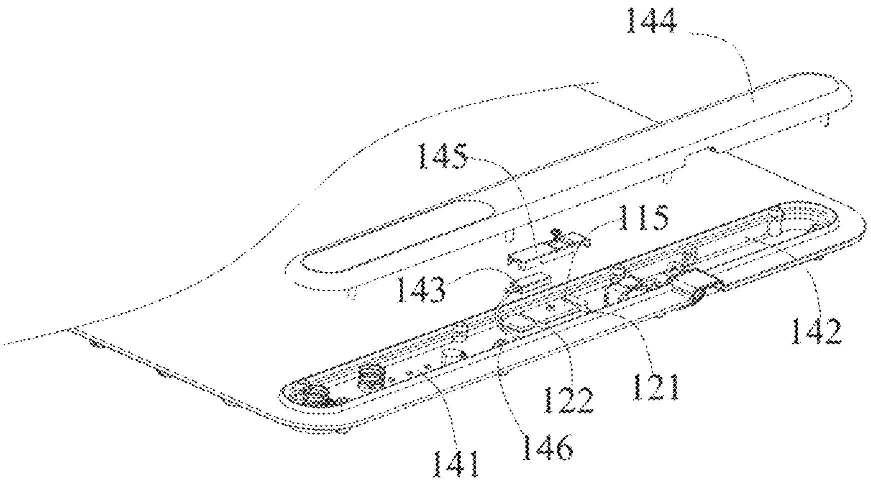
FIG. 9 is an exploded view of a portion of a food warming pad in accordance with the embodiment of the present disclosure.

As illustrated in FIG. 1 to FIG. 9, the embodiments relate to a manufacturing process for a food warming pad 1. The manufacturing process of the food warming pad is simplified, enhancing the manufacturing efficiency.

In some embodiments, the manufacturing process of the food warming pad includes the following steps.

Step S1, forming a pad body 11 by an integrated molding process. The integrated pad body 11 includes a first surface 111 and a second surface 112. A groove 110 is formed on the second surface 112 during the integrated molding process of the pad body 11.

Step S2, embedding the heating wire 12 into the groove 110 of the pad body 11, and exposing a first surface 121 and a second surface 122 of the heating wire 12 out of a starting end and a terminal end b of the groove 110 respectively to form a heating body.

Step S3, forming a packaging body by applying an encapsulation glue 13 to the groove 110 with the heating wire 12 embedded within.

Step S4, drying the packaging body at step S3 to make the packaging body to solidify surface area of the encapsulation glue 13, thereby playing a preliminary fixing role on the heating wire 12 to form a first heating pad.

Step S5, forming a second heating pad by standing still the first heating pad obtained at step S4 at room temperature and pressure until the encapsulation glue 13 is completely solidified and formed. Therefore, fixing the heating wire 12 in the groove 110 is completed.

Step S6, electrically connecting the first surface 121 and the second surface 122 of the heating wire 12 to a controller 14 in sequence and fixing the controller 14 to the second heating pad to form a food warming pad 1.

Step S7, testing the food warming pad 1.

In the manufacturing process of the food warming pad provided in the embodiments involves forming the pad body 11 through an integrated molding process. The heating wire 12 is embedded into the groove 110 and cured with the encapsulation glue. Then the controller 14 is installed and tested to obtain the food warming pad 1. The manufacturing process of the food warming pad designed in this way eliminates the need for processes such as cutting, aligning, bonding, pressing and fixing, thereby simplifying the manufacturing process and improves the manufacturing efficiency of the food warming pad 1, and solving the problems of edge separation and curling.

In some embodiments, the pad body 11 coated with the encapsulation glue 13 is baked by a drying device. During the baking process, the baking temperature range is set between 70° C. and 80° C., and the baking time is controlled between 15 minutes and 20 minutes. Setting the baking temperature between 70° C. and 80° C. allows the surface of the encapsulation glue 13 to dry and solidify quickly, resulting in a good protective layer. A lower baking temperature not within the set temperature range extra surfaces the drying time and compromises the manufacturing efficiency. A higher baking temperature not within the set temperature range jeopardizes the performance of the encapsulation glue 13. In some embodiments, the pad body 11 is baked at a temperature of 75° C. in the drying device for 18 minutes.

In some embodiments, the baking temperature is 70° C., 71° C., 72° C., 73° C., 74° C., 76° C., 77° C., 78° C., 79° C., 80° C., etc., and the baking time is controlled at 15 minutes, 16 minutes, 17 minutes, 19 minutes, 20 minutes, etc. In other words, if the surface of the encapsulation glue 13 on the pad body 11 is cured, the baking temperature can be selected at any temperature between 70° C. and 80° C. and the baking time can be controlled at any time between 15 minutes and 20 minutes.

As illustrated in FIG. 1 to FIG. 9, in some embodiments, the pad body 11 utilizes food-grade flexible silicone as a raw material and is integrally formed by a hot-pressing molding equipment. In some embodiments, the material of the pad body 11 may be flexible plastic. In some embodiments, the hot-pressing molding equipment is a vacuum vulcanizer having a mold for molding the pad body 11. The mold has a structure for molding a line groove 110, a heat insulation boss 113, a mounting port 114, a mounting portion 115 and a protrusion 1101. The table size of the vacuum vulcanizer is 700 mm×700 mm, and the stroke is 300 mm.

In some embodiments, the hot-pressing molding equipment may be a fully automatic silicone flat-plate molding machine, an automatic hot-pressing molding machine, etc., as long as it can integrally form the pad body 11. The heating wire 12 includes a metal heating wire, a ceramic heating wire, a PTC (Positive Temperature Coefficient) heating wire, an a infrared heating wire, a flexible heating wire, etc. In some embodiments, the heating wire 12 is a metal heating wire.

In some embodiments, after step S3, the manufacturing process also includes checking the state of the encapsulation glue 13 in the groove 110, and repairing a overflowed or a missing part of the encapsulation glue 13. The repairing method includes removing the overflowed glue or filling the missing glue. Setting this step makes the encapsulation glue 13 evenly distributed in the groove 110, which not only improves the stability of the fixation of the encapsulation glue 13 and the pad body 11, but also enhances the overall aesthetics of the food warming pad 1.

the encapsulation glue 13 includes silicone glue, phenolic resin glue, urea-formaldehyde resin glue, heat-resistant epoxy glue, polyimide glue, etc. In some embodiments, the encapsulation glue 13 is silicone glue, which includes silicone, fumed silica, crosslinking agent and coupling agent, with the mass fraction of each component being: silicone 45-70%, fumed silica 5-20%, crosslinking agent 35-45%, coupling agent 5-20%.

In some embodiments, when integrally forming the pad 11, a plurality of insulating protrusions 113 are formed on the second surface 112, with groove 110 threaded between the insulating protrusions 113. In some embodiments, the insulating protrusions 113 are evenly distributed on the second surface 112, and the groove 110 is arranged in a continuous S-shape across the second surface 112.

In some embodiments, when the pad body 11 is integrally formed, a protrusion 1101 is formed on an inner side wall of the groove 110. When the heating wire 12 is embedded, the protrusion 1101 limits the heating wire 12 in the groove 110, completing the pre-installation of the heating wire 12 in the groove 110. This not only makes the heating wire 12 fit with the bottom of the groove 110 to ensure the heat conduction efficiency of the food warming pad 1, but also facilitates the coating of the encapsulation glue 13.

In some embodiments, the protrusion 1101 includes a group of protrusions only arranged on one inner side wall of the groove 110. In some embodiments, the protrusion 1101 includes two groups of parallel protrusions arranged on two opposing inner side walls of the groove 110. In some embodiments, the protrusion 1101 includes a continuous protrusion integrally formed along the inner side wall of the groove 110. In some embodiments, the protrusion 1101 includes a plurality of multi-section protrusions integrally formed on the inner side wall of the groove 110 and arranged at intervals on a same plane. The protrusion 1101 can be strip-shaped with a semicircular cross section or a wedge-shaped cross section, or a dot-shaped that is hemispherical as a whole. The protrusion 1101 only needs to be able to limit the heating wire 12 within the groove 110. In some embodiments, the protrusion 1101 includes two sets of continuous protrusions parallel to each other arranged on the two opposing inner side walls of the groove 110, and the spacing between the two sets of continuous protrusions is less than a diameter of the heating wire 12.

In some embodiments, step S1 includes the following sub-steps.

Step S11, weighing a flexible silicone raw material and supplementing or cutting the flexible silicone raw material according to a weighing result to obtain a first raw material. The weight of the flexible silicone raw material reaches a preset weight range.

Step S12, putting the first raw material into a hot-pressing molding equipment, extruding and molding, and forming a pad body blank with a groove 110 and a protrusion 1101.

Step S13, taking out the pad body blank and removing burrs after cooling to obtain the pad body 11.

The edge materials generated after the flexible silicone raw material is formed into the pad body 11 by the hot-pressing molding equipment can no longer be used for the production of the pad body 11. Therefore, by weighing the flexible silicone raw material, the amount of the flexible silicone raw material is effectively controlled, which reduces the production of edge materials and saving costs. In addition, the one-piece molded pad body 11 not only effectively avoids the occurrences of edge separation and curling and improve the service life of the food warming pad 1, but also simplify the manufacturing process of the food warming pad 1. The molded pad body 11 can be directly used for assembly, facilitating industrial production and processing.

In some embodiments, before step S12, the first raw material needs to be cut. Since the first raw material is a flexible silicone material, which is usually in the form of sheets, cutting and placing the first raw material in the one-piece molding equipment facilitates the handling of the first raw material, making it easier to put into the cavity of the one-piece molding equipment, but also allows for the cut first raw material to be spaced in the cavity of the hot-pressing molding equipment. This arrangement helps the first raw material quickly fill the entire mold cavity when heated, thereby improving the molding quality of the pad body 11.

In some embodiments, a length and width of the pad body 11 is 600 mm×400 mm. The preset weight of the flexible silicone raw material obtained at step S11 is between 1.1 kg and 1.4 kg. The preset weight is determined according to the size of the pad body 11. If the weight of the flexible silicone material is less than 1.1 kg, the first material may not fully fill the entire mold cavity during the integral molding process, easily leading to defects such as missing corners, damage, or uneven thickness of the molded pad. Conversely, if the weight of the flexible silicone material exceeds 1.4 kg, it can result in significant material waste and a substantial increase in manufacturing costs.

In some embodiments, the molding temperature of the first raw material in the hot-pressing molding equipment is controlled between 140° C. and 180° C., the molding pressure is controlled between 165 kPa and 195 kPa, and the molding time is controlled between 60 seconds and 160 seconds. In some embodiments, the molding temperature is 160° C., the molding pressure is 180 kPa, and the molding time is 110 seconds.

In some embodiments, the molding temperature may be 140° C., 145° C., 150° C., 155° C., 165° C., 170° C., 175° C., 180° C., etc. The molding pressure may be 165 kPa, 170 kPa, 175 kPa, 185 kPa, 190 kPa, 195 kPa, etc. The molding temperature may be 60 seconds, 70 seconds, 80 seconds, 90 seconds, 100 seconds, 120 seconds, 130 seconds, 140 seconds, 150 seconds, 160 seconds, etc.

In some embodiments, after step S13, the manufacturing process further includes step S14: treating a surface of the first surface 111 of the pad body 11, and forming a logo pattern on the first surface 111 by silk screen processing.

In some embodiments, the logo pattern can be a temperature-changing pattern, which is silk-screened with temperature-changing ink. The logo pattern includes brand LOGO pattern, anti-scalding warning pattern, anti-touch warning pattern, no-washing warning pattern and decorative pattern. In some embodiments, decorative pattern or brand LOGO pattern may not be included, and the logo pattern can be selected according to production requirements.

In some embodiments, after step S14, the manufacturing process further includes step S15: spraying oil to the first surface 111. Forming a layer of oil film on the first surface 111 by oil spraying processing facilitates wiping and cleaning of the pad body 11.

In some embodiments, the pad body 11 obtained at step S13 may be directly subjected to oil spraying processing. It is also possible to only perform silk screen processing on the pad body 11 obtained at step S13.

As illustrated in FIG. 1 to FIG. 7, in some embodiments, before installing the controller 14, the heating wire 12 extending out of the groove 110 is cut to allow each of the first surface 121 and the second surface 122 of the heating wire 12 to form a terminal that can be electrically connected to the controller 14.

In some embodiments, step S1 also includes forming a mounting port 114 on one side of the pad body 11, and step S6 includes the following sub-steps.

Step S61, welding a circuit board 141 of a controller 14 to a terminal of the first end 121 to connect the circuit board 141 and the first surface 121 to form a third heating pad.

Step S62, welding a first connection end of a temperature control probe 143 to a terminal of the second end 122, and welding a second connection end of the temperature control probe 143 to the circuit board 141 to form a fourth heating pad. Therefore, the circuit board 141 is connected to the second surface 122 through the temperature control probe 143.

Step S63, installing a first housing 142 of the controller 14 in the mounting port 114 of the fourth heating pad and installing the circuit board 141 in the first housing 142 to form a fifth heating pad.

Step S64, fixing the temperature control probe 143 around the heating wire 12 to form a sixth heating pad.

Step S65, locking the second housing 144 having a control button with the first housing 142 on the fifth heating pad to obtain a food warming pad 1.

Forming the mounting port 114 on the pad body 11 and installing the controller 14 in the mounting port 114 enhances the integrity of the food warming pad 1 and makes the food warming pad 1 more concise and beautiful. Additionally, the temperature control probe 143 is arranged outside the pad body 11, and the temperature control probe 143 is assembled when the circuit board 141 is installed. This not only avoids the problem of cumbersome processing of the pad body 11 caused by arranging the temperature control probe 141 inside the pad body 11, but also separate the processing of the pad body 11 from the installation of the temperature control probe 143, which is more conducive to the assembly line production of the food warming pad 1.

In some embodiments, before step S61, the manufacturing process also includes: electrically connecting an auxiliary connecting wire 146 to a wiring terminal of the first end 121 and a wiring terminal of the second end 122, allowing the first surface 121 and the second surface 122 of the heating wire 12 to be electrically connected to the circuit board 141 and the temperature control probe 143 respectively.

To ensure the heating efficiency and power of the heating wire 12, the heating wire 12 has a small diameter. By setting the auxiliary connecting wire 146, the first surface 121 and the second surface 122 are indirectly electrically connected to the circuit board 141 and the temperature control probe 143, which is more conducive to the circuit connection between the heating wire 12 and the circuit board 141. The auxiliary connecting wire 146 is electrically connected to the first surface 121 and the second surface 122 of the heating wire 12 by riveting or winding with each other. In some embodiments, the auxiliary connecting wire 146 is electrically connected to the first surface 121 and the second surface 122 of the heating wire 12 by riveting.

In some embodiments, before step S61, the manufacturing process also includes waterproofing the circuit board 141, i.e., spraying waterproof glue on the circuit board 141, and standing until the waterproof glue is completely solidified, and then performing subsequent processing.

In some embodiments, before step S61, only perform waterproofing to the circuit board 141, and the heating wire 12 can be directly welded to the circuit board 141 and the temperature control probe 143. In some embodiments, waterproofing is not performed to the circuit board 141, but directly electrically connect the heating wire 12 to the circuit board 141 and the temperature control probe 143 through the auxiliary connecting wire 146. In some embodiments, waterproofing is performed to the circuit board 141 and electrically connect the heating wire 12 to the circuit board 141 and the temperature control probe 143 through the auxiliary connecting wire 146. When the circuit board 141 is waterproofed and the heating wire 12 is electrically connected to the circuit board 141 and the temperature control probe 143 through the auxiliary connecting wire 146 before step S61, the circuit board 141 can be waterproofed first, and then the auxiliary connecting wire 146 can be connected; or the auxiliary connecting wire 146 is riveted to the wiring terminal of the first end 121 and the wiring terminal of the second end 122 respectively, and then the circuit board 141 is waterproofed.

As illustrated in FIG. 1 to FIG. 7, in some embodiments, step S1 also includes: forming a mounting portion 115 on an inner side wall of the mounting port 114. After the temperature control probe 143 is electrically connected to the circuit board 141, the temperature control probe 143 is placed on the mounting portion 115, and the temperature control probe 143 is fixed by assembling a cover plate 145 and the first housing 142.

When the mounting portion 115 is formed, an upper surface of the mounting portion 115 is formed with a receiving groove 116, and a portion of the heating wire 12 extending out of the groove 110 is received in the receiving groove 116. The temperature control probe 143 is placed on the mounting portion 115, allowing a detection surface of the temperature control probe 143 to be located above the receiving groove 116 and the temperature of the heating wire 12 can be detected.

In some embodiments, step S7 includes detecting whether the temperature control probe 143 and the heating wire 12 are powered on and detecting whether the heating wire 12 is heated after being powered on.

In some embodiments, after step S7, the manufacturing process also includes wiping and packaging the food warming pad 1. In some embodiments, industrial alcohol is used for disinfection and wiping.

From the above description, the above-mentioned embodiments of the present disclosure achieve the following technical effects.

1) The pad body 11 is made by an integrated molding process, the heating wire 13 is embedded in the groove 110 and the encapsulation glue is cured, and then the controller is installed and tested to make the food warming pad 1. The manufacturing process of the food warming pad designed in this way eliminates the requirements of cutting, aligning, bonding, pressing and fixing, etc., which not only simplifies the manufacturing process of the food warming pad and improves the production efficiency of the food warming pad, but also solve the problems of edge separation and curling.

2) Checking the coating state of the encapsulation glue 13 in the groove 110 and repairing where the encapsulation glue 13 is overflowed or missed, removing the overflowed glue or filling the missed part. This allows the encapsulation glue 13 to be evenly distributed in the groove 110, not only improving the stability of the combination of the encapsulation glue 13 and the pad body 11, but also enhancing the overall aesthetics of the food warming pad 1.

3) Cutting the first raw material and placing it in the integrated molding device not only facilitates handling of the flexible silicone raw material into the cavity of the integrated molding device, which is conducive to the first raw material quickly filling the entire mold cavity under heating conditions, thereby improving the molding quality of the pad body 11.

4) Setting the temperature control probe 143 outside the pad body 11 and assembling the temperature control probe 143 when installing the circuit board 141 not only avoids the cumbersome processing of the pad body 11 caused by setting the temperature control probe 141 in the pad body 11, further simplifying the production of the pad body 11, but also separating the processing of the pad body 11 from the installation of the temperature control probe 141, which is more conducive to the assembly line production of the food warming pad 1.

5) The setting of the protrusion 1101 limits the heating wire 12 within the groove 110 when the heating wire 12 is embedded, so that the heating wire 12 is pre-installed in the groove 110. This not only allows the heating wire 12 to fit with the bottom of the groove 110 to ensure the heat conduction efficiency of the food warming pad 1 and is more conducive to the coating of the encapsulation glue 13.

The above description is only some embodiments of the present disclosure and is not intended to limit the scope of the present disclosure. Any equivalent changes or modifications made according to the structure, characteristics and principles described in the protection scope of the present disclosure should be included in the protection scope of the present disclosure.

What is claimed is:

1. A manufacturing process for a food warming pad, comprising:

step S1, forming a pad body comprising a first surface and a second surface having a groove by an integrated molding process;

step S2, embedding a heating wire into the groove of the second surface of the pad body and exposing two ends of the heating wire out of a starting end and a terminal end of the groove respectively to form a heating body;

step S3, applying an encapsulation glue into the groove with the heating wire embedded within to form a packaging body;

step S4, drying the packaging body to solidify a surface of the encapsulation glue to form a first heating pad;

step S5, standing the first heating pad at room temperature and pressure until the encapsulation glue is completely solidified to form a second heating pad;

step S6, electrically connecting the two ends of the heating wire to a controller and fixing the controller to the second heating pad to form the food warming pad;

wherein step S6 comprises:

step S61, welding a circuit board of the controller to a first wiring terminal of a first end of the heating wire to form a third heating pad;

step S62, welding a first connection end of a temperature control probe to a second wiring terminal of a second end of the heating wire and welding a second connection end of the temperature control probe to the circuit board to form a fourth heating pad;

step S63, installing a first housing of the controller into a mounting port of the fourth heating pad, and installing the circuit board into the first housing to form a fifth heating pad;

step S64, forming a mounting portion in the mounting port, forming two receiving grooves on an upper surface of the mounting portion, the two receiving grooves configured to receive the two ends of the heating wire, placing the temperature control probe between the two receiving grooves on the mounting portion and assembling a cover plate to the first housing to fix the temperature control probe to form a sixth heating pad; and step S65, locking a second housing having a control button to the first housing on the sixth heating pad to obtain the food warming pad; and step S7, testing the food warming pad.

2. The manufacturing process of the food warming pad according to claim 1, wherein, at step S4, the packaging body is baked in a drying device at a temperature of 70 to 80° C. for 15 to 20 minutes.

3. The manufacturing process of the food warming pad according to claim 1, wherein, at step S1, the pad body is made of food-grade flexible silicone and is integrally formed by a hot-pressing molding equipment.

4. The manufacturing process of the food warming pad according to claim 3, wherein step S1 comprises:

step S11, weighing a raw material made of flexible silicone, and supplementing or cutting the raw material according to a weighing result to allow the raw material to reach a preset weight range, and obtaining a first raw material;

step S12, putting the first raw material into the hot-pressing molding equipment, extruding, and molding to form a pad body blank having the groove; and step S13, taking out the pad body blank and removing burrs after cooling to obtain the pad body.

5. The manufacturing process of the food warming pad according to claim 4, wherein, at step S12, a molding temperature of the first raw material is between 14° and 180° C., a molding pressure is between 165 and 195 kPa, and a time duration is between 60 and 160 seconds.

6. The manufacturing process of the food warming pad according to claim 4, wherein after step S13, the manufacturing process further comprises step S14: performing surface treatment to the first surface of the pad body and forming a logo pattern on the first surface by silk screen processing.

7. The manufacturing process of the food warming pad according to claim 6, wherein after step S14, the manufacturing process comprises step S15: spraying oil to form an oil film on the first surface of the pad body.

8. The manufacturing process of the food warming pad according to claim 4, wherein at step S11, the preset weight of the raw material is between 1.1 and 1.4 kg.

9. The manufacturing process of the food warming pad according to claim 4, wherein before step S12, the manufacturing process comprises cutting the first raw material.

10. The manufacturing process of the food warming pad according to claim 4, wherein step S12 further comprises: forming a protrusion on an inner side wall of the groove to limit the heating wire after the heating wire is embedded in the groove.

11. The manufacturing process of the food warming pad according to claim 1, wherein after step S3, the manufacturing process further comprises: checking a coating state of the encapsulation glue in the groove and repairing an overflowed or missing part of the encapsulation glue.

12. The manufacturing process of the food warming pad according to claim 1, wherein before step S6, the manufacturing process further comprises: cutting the two ends of the heating wire to form the first wiring terminal and the second wiring terminal capable of being electrically connected to the controller.

13. The manufacturing process of the food warming pad according to claim 1, wherein before step S61, the manufacturing process further comprises: electrically connecting an auxiliary connecting wire to the first wiring terminal of the first end and the second wiring terminal of the second end respectively, and connecting the auxiliary connecting wire of the first end and the auxiliary connecting wire of the second end of the heating wire to the circuit board and the temperature control probe respectively.

14. The manufacturing process of the food warming pad according to claim 1, wherein before step S61, the manufacturing process further comprises: spraying waterproof glue on the circuit board and standing until the waterproof glue is completely solidified.

15. The manufacturing process of the food warming pad according to claim 1, wherein step S7 comprises: detecting whether the food warming pad is powered on and whether the heating wire generates heat after being powered on.

16. The manufacturing process of the food warming pad according to claim 1, wherein step S1 further comprises: forming a plurality of insulating protrusions on the second surface, and the groove is arranged around the plurality of insulating protrusions.

17. The manufacturing process of the food warming pad according to claim 1, wherein after step S7, the manufacturing process further comprises: wiping and packaging the food warming pad.

* * * * *